United States Patent [19]
Suzuki

[11] Patent Number: 5,376,061
[45] Date of Patent: Dec. 27, 1994

[54] COMPOUND MACHINE TOOL CAPABLE OF LASER BEAM PROCESSING

[75] Inventor: Ryuji Suzuki, Yamanashi, Japan
[73] Assignee: Fanuc Ltd., Yamanashi, Japan
[21] Appl. No.: 162,147
[22] PCT Filed: Apr. 20, 1993
[86] PCT No.: PCT/JP93/00511
§ 371 Date: Dec. 17, 1993
§ 102(e) Date: Dec. 17, 1993
[87] PCT Pub. No.: WO93/20975
PCT Pub. Date: Oct. 28, 1993

[30] Foreign Application Priority Data
Apr. 20, 1992 [JP] Japan ................. 4-099699

[51] Int. Cl.$^5$ .................. B23Q 3/157; B23K 26/00
[52] U.S. Cl. ................. 483/13; 219/121.74; 219/121.78; 483/16; 483/19
[58] Field of Search ......... 483/28, 29, 16, 18, 483/19, 13; 409/201, 211; 219/121.74, 121.73, 121.78, 121.67

[56] References Cited

U.S. PATENT DOCUMENTS

| | | | |
|---|---|---|---|
| 4,794,222 | 12/1988 | Funayama et al. | 219/121.78 |
| 4,855,565 | 8/1989 | Thomas et al. | 219/121.74 X |
| 4,951,376 | 8/1990 | Grund | 483/14 |

FOREIGN PATENT DOCUMENTS

| | | | |
|---|---|---|---|
| 3308444 | 9/1984 | Germany | 483/19 |
| 61-164738 | 7/1986 | Japan . | |
| 49389 | 3/1988 | Japan | 219/121.74 |
| 4-284991 | 9/1992 | Japan . | |
| 4-289038 | 10/1992 | Japan . | |
| 2229125 | 9/1990 | United Kingdom | 219/121.73 |

*Primary Examiner*—William Briggs
*Attorney, Agent, or Firm*—Nikaido, Marmelstein, Murray & Oram

[57] ABSTRACT

A compound machine tool, for alternately carrying out a machining process and a laser-beam process, which can subsequently carry out the laser beam process on the variable inclined surfaces of a workpiece having a complex three-dimensional shape, without changing the position of the workpiece, is provided. A laser beam processing arbor (44) of this compound machine tool (10) includes an attaching section (54) closely fitted to a tool supporting section (40) of a spindle (28), a joint part (62) rotatably supported on the attaching section (54), and a discharging section (68) pivotably joined to the joint part (62) through a shaft (66). The attaching section (54) and the joint part (62) include a first passage (64) axially passing therethrough, and the discharging section (68) includes a second passage (70) axially passing therethrough. A lens (72) for condensing a laser beam is fixedly arranged in the second passage (70) of the discharging section (68). A movable reflecting plate (78) supported on the shaft (66) is arranged between the first passage (64) and the second passage (70). The movable reflecting plate (78) rotates about the shaft (66) while accompanying with the pivoting motion of the discharging section (68) relative to the attaching section (54) and the joint part (62), and directs the laser beam passing through the first passage (64) toward the lens (72) in the second passage (70) at any pivoted position of the discharging section.

6 Claims, 5 Drawing Sheets

COMPOUND MACHINE TOOL CAPABLE OF LASER BEAM PROCESSING

DESCRTIPTION

1. Technical Field

The present invention relates to a compound machine tool that can alternately carry out a machining process and a laser beam process. More particularly, the present invention relates to a compound machine tool that comprises a fixed machine block; a table arranged movably along first and second axes being orthogonal to each other on the fixed machine block; a spindle arranged movably along a third axis being orthogonal to both of the first and second axes on the fixed machine block, the spindle including a straight through passage with a certain diameter extending along the third axis inside the spindle, and a tool supporting section disposed opposite to the table so as to detachably support a tool holder holding a cutting tool at one end of the straight through passage; a laser beam path means for directing a laser beam along the third axis from a rear end of the spindle into the straight through passage; a laser beam processing arbor detachably mounted on the tool supporting section of the spindle and having inside the arbor a lens for condensing and discharging the laser beam directed by the laser beam path means; and a tool changing means for automatically mounting and removing the tool holder and the laser beam processing arbor to the tool supporting section of the spindle so as to change the holder and the arbor.

2. Background Art

A laser beam processing unit which carries out cutting, welding or heat treating processes on materials, by utilizing energy of high power laser beam produced from, e.g., a $CO_2$ gas, has recently been put to practical use. In the laser beam processing unit, the energy for processing can be adjusted merely by suitably controlling the laser beam power, so that various processes, such as cutting, welding or heat treating, can be carried out by a single unit. However, the laser beam processing unit can generally act with a laser beam only at a point near to the focus point, and is expensive regarding power requirements, thus the laser beam processing unit is unsuitable for cutting thick plates or complex three-dimensional workpieces. Therefore, it has been difficult to sequentially carry out a cutting process and a surface treating process such as heat treating on such three-dimensional workpieces by a single laser beam processing unit. When the sequential processes including the surface treating process by a laser beam processing unit would be carried out on three-dimensional workpieces, it has been necessary to first cut the workpieces by a separate machine tool. In this respect, to save the trouble of transporting the workpieces from the machine tool to the laser beam processing unit, to facilitate the programming of working processes, and to reducing the equipment scale, attempts have been made to incorporate a machine tool and a laser beam processing unit into a single compound machine.

The compound machine tool capable of a laser beam processing, of the type mentioned at the beginning of this document, is disclosed, e.g., in International Patent Application No. PCT/JP92/00314. According to this compound machine tool, a three-dimensional machining process by a cutting tool and a two-dimensional surface treating process by a laser beam can be alternately and subsequently carried out by a single machine, and thus it is possible to reduce the work time and the equipment scale.

However, in the above-mentioned compound machine tool, the laser beam is directed along a Z-axis in a spindle and a laser beam processing arbor, so as to be condensed by a lens and discharged onto a workpiece disposed on a table, therefore, from the viewpoint of the processing energy mentioned above, a laser beam surface treating process can be carried out only on a flat surface crossing the right angle to the discharging direction of the laser beam, i.e., to the Z-axis. Accordingly, to subsequently carry out the laser beam process, such as a surface treating, on variable inclined surfaces of the workpiece which is machined to a complex three-dimensional shape by a cutting tool, it is necessary to again fix the workpiece on the table while changing the position of the workpiece so as to place the inclined surface, which would be processed, on a plane crossing the right angle to the Z-axis of the spindle. Such a positioning of the workpiece requires much time and labor, and thus prevents automating the machine tool or omitting an operator for the compound machine tool and thus reducing the work time.

DISCLOSURE OF THE INVENTION

The object of the present invention is to provide a compound machine tool which can alternately carry out a machining process and a laser beam process, and which can subsequently carry out a laser beam process on the variable inclined surfaces of a workpiece having a complex three-dimensional shape, without changing the position of the workpiece.

To accomplish the above object, the present invention provides a compound machine tool of the type mentioned at the beginning of this document, wherein the laser beam processing arbor comprises an attaching section detachably fitted to the tool supporting section of the spindle, and having a first passage extending along the third axis inside the attaching section for passing a laser beam directed by the laser beam path means when being fitted; a discharging section pivotably connected to one end of the attaching section through a shaft element which is disposed perpendicular to a path of the laser beam along the third axis when the attaching section is fitted to the tool supporting section, and having a second passage connected to the first passage inside the discharging section for fixedly supporting the lens in the second passage; a laser beam reflecting means supported on the shaft element and disposed between the first passage and the second passage, for rotating about the shaft element while accompanying a pivoting motion of the discharging section, and for directing the laser beam passed through the first passage toward the lens in the second passage at any pivoted position of the discharging section; and a linking means for linking the laser beam reflecting means to the attaching section and the discharging section, so as to interlock the pivoting motion of the discharging section relative to the attaching section and a rotating motion of the laser beam reflecting means; and wherein the compound machine tool further comprises an actuating means for causing the pivoting motion of the discharging section of the laser beam processing arbor.

When carrying out a laser beam process on the desired inclined surfaces of the three-dimensional workpiece, the discharging section of the laser beam processing arbor is pivoted by the actuating means about the shaft element perpendicular to the third axis. At this time, the laser beam reflecting means fitted to the shaft element rotates simultaneously. The laser beam directed into the first passage of the discharging section of the laser beam processing arbor by the laser beam path means is reflected by the laser beam reflecting means which lies in the path of the laser beam. In this respect, the laser beam reflecting means rotates while accompanying the pivoting motion of the discharging section relative to the attaching section and has a rotating axis disposed in the path of the laser beam, therefore the reflected laser beam is directed from the first passage into the second passage at any pivoted position of the discharging section, and is discharged through the lens arranged in the second passage onto the given inclined surface of the workpiece.

According to a preferred aspect of the present invention, the laser beam reflecting means comprises a movable reflecting plate supported on the shaft element between the first passage and the second passage of the laser beam processing arbor, a reflecting surface of the movable reflecting plate being disposed in a plane involving a center axis of the shaft element. In this case, the movable reflecting plate may include a reflecting mirror on one face thereof for deflecting the path of the laser beam, and a surface of the reflecting mirror may be disposed in the plane involving the center axis of the shaft element.

According to another preferred aspect of the present invention, the laser beam reflecting means comprises a movable reflecting plate supported on the shaft element between the first passage and the second passage of the laser beam processing arbor, and the linking means comprises first guide grooves arranged on each side portion of the movable reflecting plate and extending symmetrically in relation to the shaft element and parallel to a reflecting surface of the movable reflecting plate, linking pieces disposed slidably in each of the first guide grooves, and second guide grooves arranged on walls of the first passage and the second passage of the laser beam processing arbor and extending in an axial direction of each passage, each of the linking pieces disposed in the first guide grooves being engaged with the second guide grooves.

According to further preferred aspect of the present invention, the actuating means comprises a drive unit for rotating the spindle, and a transmitting mechanism for transmitting a rotating motion of the spindle to the discharging section of the laser beam processing arbor while transferring the rotating motion to a rotating motion about the shaft element disposed perpendicular to the third axis, so as to pivot the discharging section. In this case, the transmitting mechanism may comprise a first gearwheel fixed coaxially to the spindle, and a second gearwheel supported on the shaft element of the laser beam processing arbor and connected to the discharging section so as to engage with the first gearwheel when the laser beam processing arbor is mounted on the tool supporting section.

BRIEF DESCRIPTION OF THE DRAWINGS

The foregoing and the other objects, features, and advantages of the present invention will be described with relation to the embodiments shown in the accompanying drawings, in which;

FIG. 3b is a plan view of the spindle and the laser beam processing arbor seen from an arrow a of FIG. 3a;

FIG. 4b is an exploded perspective view of the inside structure in FIG. 4a;

BEST MODE OF CARRYING OUT THE INVENTION

Figure 1:
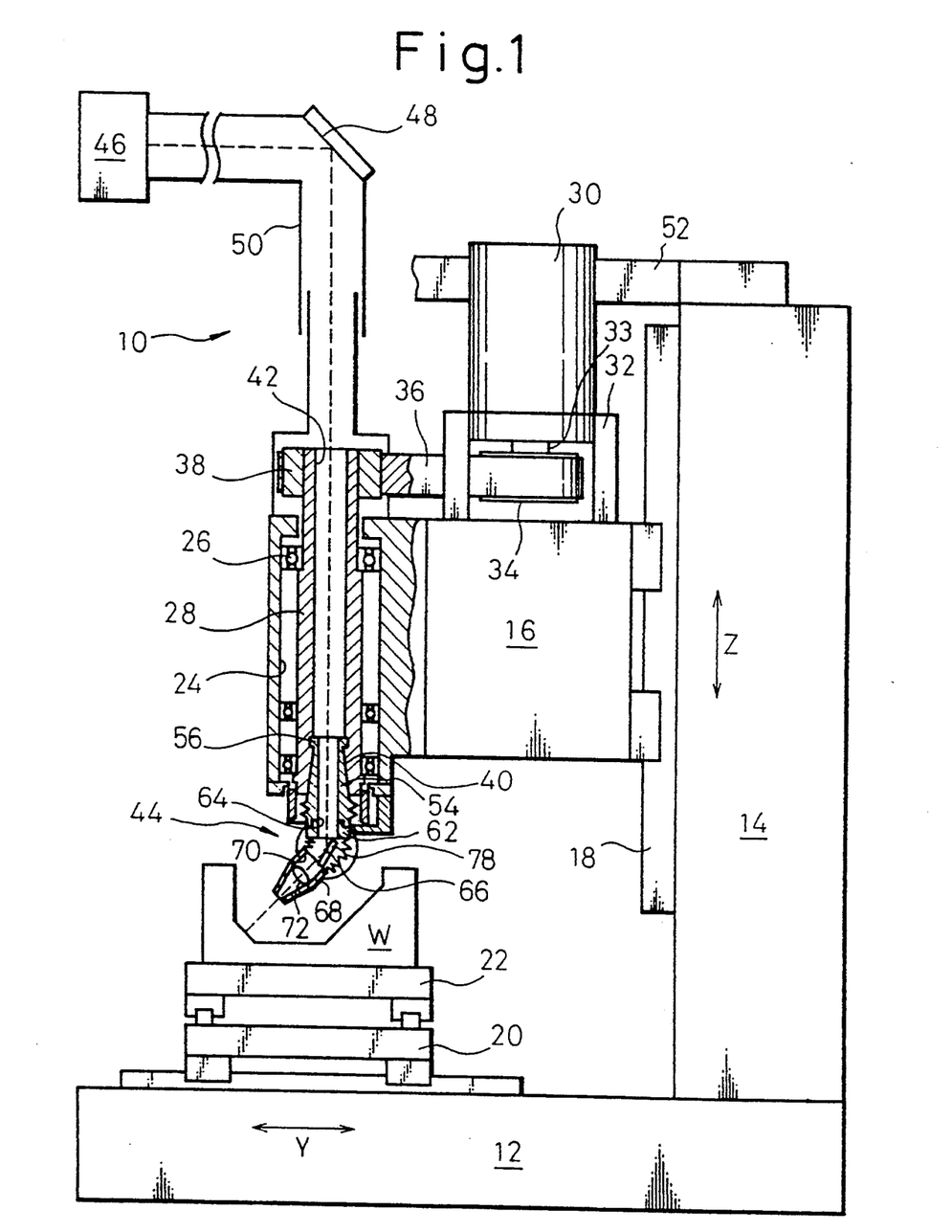
FIG. 1 is a partial sectional side view of a compound machine tool according to the embodiment of the present invention, showing a spindle and a laser beam processing arbor in a section.
Figure 2:
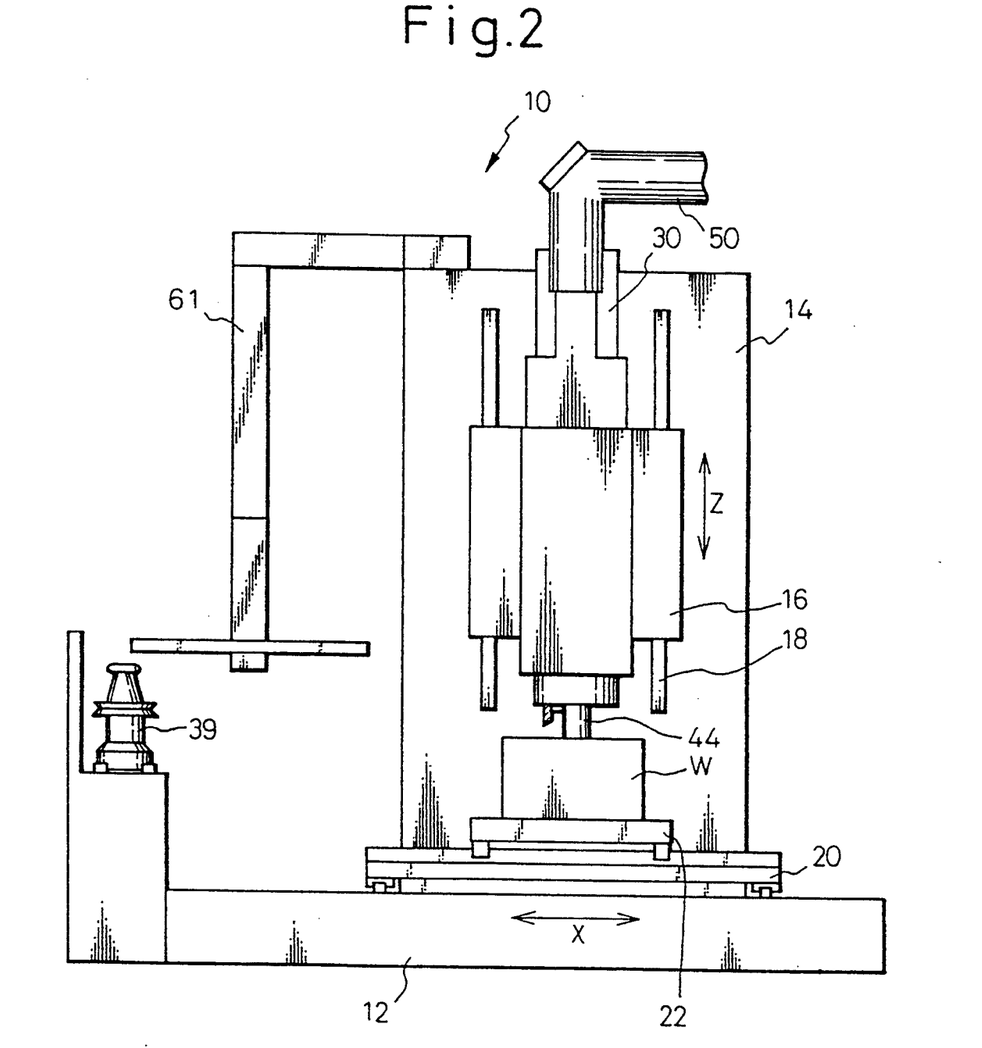
FIG. 2 is a front view of the compound machine tool shown in FIG. 1.

Referring to the drawings, FIGS. 1 and 2 show a compound machine tool 10 capable of laser beam processing, according to the embodiment of the present invention. The compound machine tool 10 includes a spindle head 16 arranged movably in a vertical direction, i.e., along a Z-axis (shown by an arrow in FIG. 1), on a column 14 which is raised on a bed 12 disposed on a floor as a fixed machine block. The spindle head 16 is moved along the Z-axis on rails 18, which extend in a vertical direction at the front face of the column 14, by an operation of a not-shown motor. A saddle 20 is arranged on the bed 12 and beneath the spindle head 16 supported by the column 14, and can be moved in a forward and rearward direction relative to the column 14, i.e., along a Y-axis (shown by an arrow in FIG. 1) crossing at right angles to the Z-axis, by an operation of a not-shown motor. Further, a table 22 is arranged on the upper face of the saddle 20, and can be moved in a lefthand and righthand direction relative to the column 14, i.e., along a X-axis (shown by an arrow in FIG. 2) crossing at right angles to the Y-axis and the Z-axis, by an operation of a not-shown motor.

At the front end of the spindle head 16, a spindle 28 is arranged rotatably through a bearing 26 in a cylindrical bore 24 extending along the Z-axis. The spindle 28 rotates about an axis parallel to the moving direction of the spindle head 16, i.e., to the Z-axis, by an operation of a spindle motor 30. The spindle motor 30 is supported on the upper face of the spindle head 16 by legs 32. An output shaft 33 of the motor is connected to the tail end of the spindle 28 through a drive pulley 34, a belt 36, and a driven pulley 38, and thereby rotates the spindle 28. A tool supporting section 40 with a tapered shape is formed at the end of the spindle 28, on which a tool holder 39 (see FIG. 2) holding a cutting tool is detachably mounted. In a machining process, the tool holder 39 is mounted on the tool supporting section 40, and the spindle 28 rotates so as to three-dimensionally machine a workpiece W fixed on the table 22.

As shown in FIG. 1, the spindle 28 has a hollow cylindrical shape and includes a straight through passage 42 longitudinally passing through the inside of the spindle. A hollow laser beam processing arbor 44 also having a through passage can be detachably mounted on the tool supporting section 40 at the end of the spindle. A laser beam (shown by a dashed line in FIG. 1) is incident into the straight through passage 42 of the spindle 28 from the rear side of the spindle 28. The laser beam is radiated from a generator 46 located at a certain position in a factory, and is directed by one or more mirrors 48 as occasion demands so as to enter into the straight through passage 42 from the rear side of the spindle 28. The entering path of the laser beam into the spindle 28 can be aligned with the center axis of the spindle 28 by adjusting the position and angle of the mirror 48. Consequently, the laser beam enter into the spindle 28 in a manner parallel to the moving direction of the spindle 28 (i.e., Z-axis). A duct member 50 is arranged above the tail end of the spindle 28 for protecting the laser beam. The duct member 50 is telescopic, as shown in FIG. 1, so as to permit the spindle 28 to move along the Z-axis. The mirror 48 and the duct member 50 constitute a laser beam path means.

The compound machine tool 10 according to the present invention includes a tool changer 52 having a known structure for suitably changing the laser beam processing arbor 44 with the tool holder 39 holding a cutting tool. Also, a draw bar (not shown) may be arranged in the straight through passage 42 of the spindle 28, so as to enable the automatic change of the laser beam processing arbor 44 and the tool holder, while accompanying with the tool changer 52. In this case, a straight through hole must be provided for passing the laser beam in the draw bar along the longitudinal center axis thereof. For example, the draw bar, having such a through hole, disclosed in International Patent Application No. PCT/JP91/01791 can be used. Further in this case, an actuating means (not shown) for the draw bar may be arranged in the spindle head 16.

Figure 3A:
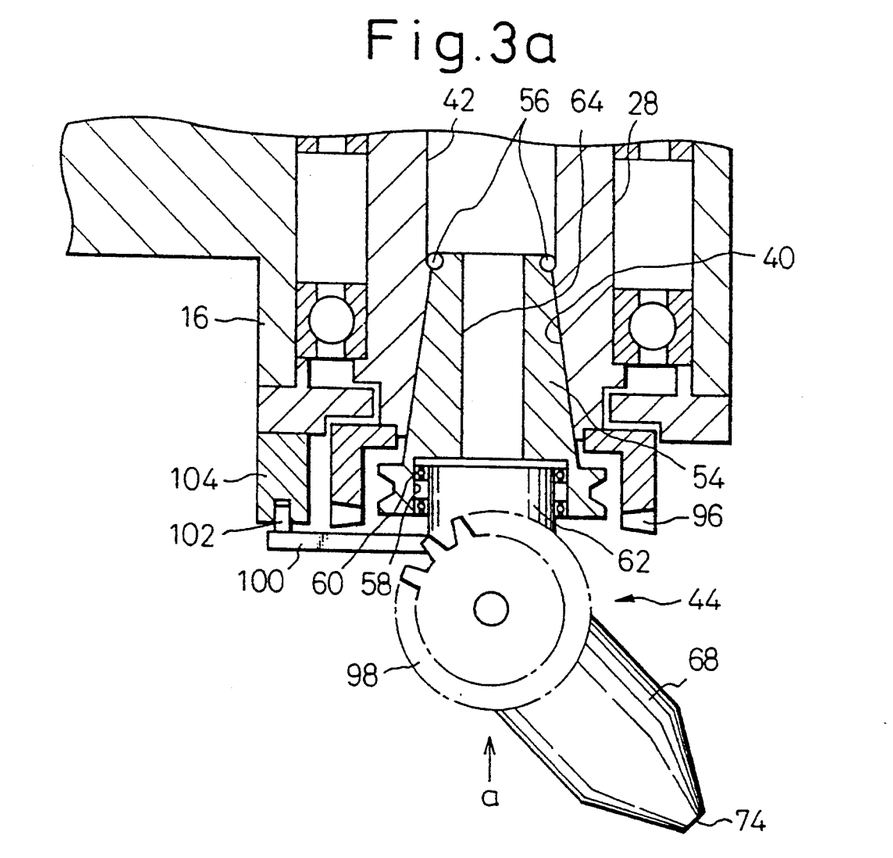
FIG. 3a is an enlarged partial sectional view of the spindle and the laser beam processing arbor shown in FIG. 1.

As shown in FIG. 3a, the laser beam processing arbor 44 includes an attaching section 54 adapted to be closely supported on the tool supporting section 40 of the spindle 28. The attaching section 54 has generally the same tapered profile as a known attaching section of the tool holder 39, and includes a known pull-stud hook part 56 adapted to be hooked on the tool supporting section 40. The attaching section 54 also includes a cylindrical joint part 62 rotatably supported through a bearing 60 in a cylindrical recess 58 which axially extends at the large diameter side of the attaching section. The center axis of the attaching section 54 including the joint part 62 is aligned with the center axis of the spindle 28.

Figure 4A:
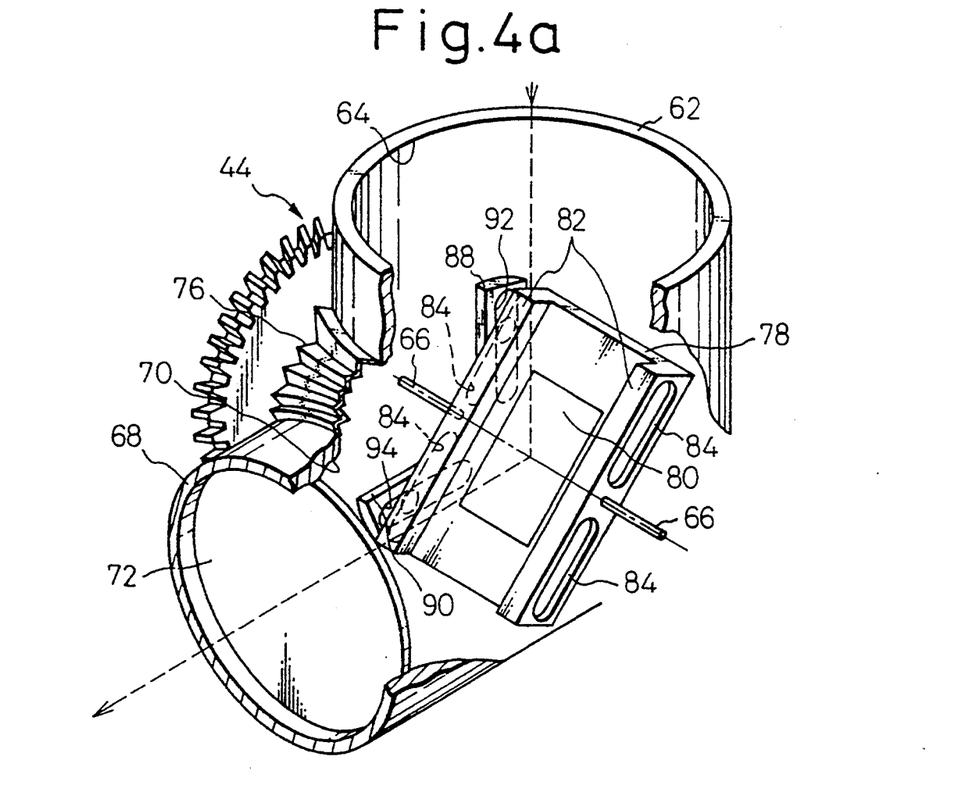
FIG. 4a is a partly cut-away enlarged perspective view showing the inside structure of the laser beam processing arbor in FIG. 1.

As shown in FIGS. 3a and 4a, the laser beam processing arbor 44 is provided with a first passage 64 made by connecting straight passages each of which axially passes through the interior of the attaching section 54 and the joint part 62. When the laser beam processing arbor 44 is mounted on the tool supporting section 40 of the spindle 28, the first passage 64 can pass the laser beam, being directed along the Z-axis in the spindle 28 by the mirror 48 and the duct member 50, in a Z-axis direction without any interference.

A shaft 66 crossing at right angles to the extending direction of the first passage 64 is fitted to the end portion of the joint part 62 outwardly projecting from the attaching section 54, and a discharging section 68 is connected through the shaft 66 to the joint part 62 in a mutually pivotable manner. Accordingly, the shaft 66 is disposed perpendicular to the path of the laser beam along the Z-axis, when the laser beam processing arbor 44 is mounted on the tool supporting section 40. The discharging section 68 is provided, as an inside through passage, with a second passage 70 which is connected to the first passage 64 of the attaching section 54 and joint part 62. The discharging section 68 also includes a lens 72 for condensing the laser beam, which is fixedly arranged in the second passage 70. The laser beam passing through the lens 72 is discharged from a discharging port 74 (FIG. 3a) of the discharging section 68 so as to make a focus point at a certain position, and carries out a non-contact process on a workpiece W near the focus point. The discharging section 68 is connected through a bellows-like cover 76 to the joint part 62, and thereby the first passage 64 and the second passage 70 is covered from atmosphere.

A movable reflecting plate 78 fixed to the shaft 66 is disposed between the joint part 62 and the discharging section 68 of the laser beam processing arbor 44 so as to bridge over the first passage 64 and the second passage 70. The movable reflecting plate 78 includes a reflecting mirror 80 on one face thereof for deflecting the path of the laser beam, and thus constitutes a laser beam reflecting means of the present invention. The surface of the reflecting mirror 80, i.e., a reflecting surface, lies in a plane involving the center axis (shown by a chain line in FIG. 4a) of the shaft 66. Consequently, the laser beam (shown by a dashed line in FIG. 4a) passing through the first passage 64 is reflected by the reflecting mirror 80 always on the center axis of the shaft 66 regardless of the tilt angle of the movable reflecting plate 78, and thus advances in a given direction.

Figure 4B:
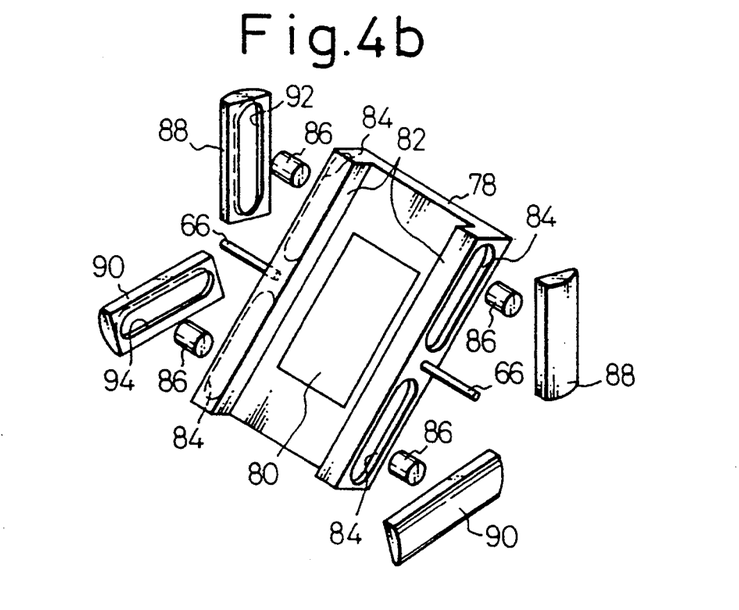

As shown in FIGS. 4a and 4b, each side portion 82 of the movable reflecting plate 78 is provided with a pair of guide grooves 84 extending parallel to the reflecting surface of the reflecting mirror 80 at the symmetrical positions in relation to the shaft 66. Generally cylindrical linking pieces 86 are slidably arranged in each of the guide grooves 84, which has a length larger than the depth of each guide groove 84. On the other hand, each of the joint part 62 and the discharging section 68 of the laser beam processing arbor 44 is provided with a pair of guide plates 88, 90 respectively fixed on the inner wall of each passage 64, 70, at the positions permitting the engagement with the linking pieces 86 arranged in the guide grooves 84. Each of the guide plates 88, 90 includes a straight guide groove 92, 94, respectively, with which the linking piece 86 can be engaged. The guide plates 88, 90 are fixed to the inner walls of the joint part 62 and the discharging section 68 so that the extending directions of the guide grooves 92, 94 coincide with the center axis directions of the passages 64, 70, respectively.

Therefore, when interposing the linking pieces 86 slidable in the grooves between the guide grooves 84 provided on the side portions 82 of the movable reflecting plate 78 and the guide grooves 92, 94 of the guide plates 88, 90 fixed to the inner walls of the joint part 62 and the discharging section 68, the mutual pivoting action between the joint part 62 and the discharging section 68 in relation to the shaft 66 is transmitted to the movable reflecting plate 78 through the guide plates 88, 90, the guide grooves 92, 94, the linking pieces 86, and the guide grooves 84, and thereby the movable reflecting plate 78 rotates about the shaft 66 together with the reflecting mirror 80. Thus, the guide plates 88, 90, the guide grooves 92, 94, the linking pieces 86, and the guide grooves 84 constitute a linking means of the present invention. In view of such construction, it is preferred that at least the inner walls of the guide grooves 84, 92, 94 and the outer surfaces of the linking pieces 86 are made of the material having a rigidity hard to deform and a good slidability.

Figure 3B:
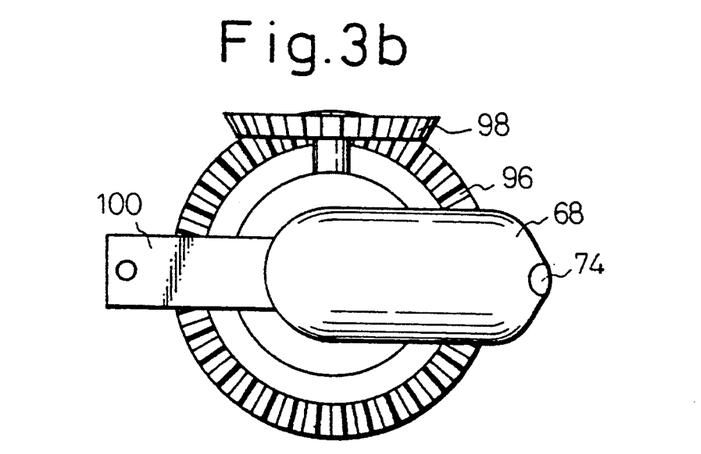

As shown in FIGS. 3a and 3b, an actuating means for pivoting the discharging section 68 of the laser beam processing arbor 44 relative to the attaching section 54 and the joint part 62 includes a gear transmitting mechanism which comprises a first gearwheel 96 fixed to the end of the spindle 28 near the tool supporting section 40 and a second gearwheel 98 supported by one end of the shaft 66 outwardly projecting from and passing through the wall of the laser beam processing arbor 44. The first gearwheel 96 and the second gearwheel 98 are preferably made of bevel gears, and engaged with each other when the laser beam processing arbor 44 is mounted on the tool supporting section 40. The first gearwheel 96 is fixed to the spindle 28 while having the common center axis to the spindle 28, and rotates with the spindle 28. The second gearwheel 98 is fixed to the discharging section 68 of the laser beam processing arbor 44, and rotates about the shaft 66 while accompanying the pivoting motion of the discharging section 68. A stopper 100 is fixed to the joint part 62 of the laser beam processing arbor 44. The stopper 100 projects outward beyond the first gearwheel 96 when the laser beam processing arbor 44 is mounted on the tool supporting section 40, and a protrusion 102 of the stopper is fitted into and hooked with a hooking part 104 secured to the spindle head 16.

Consequently, when mounting the laser beam processing arbor 44 on the tool supporting section 40 of the spindle 28 and rotating the spindle 28, this rotating motion is transmitted to the discharging section 68 of the laser beam processing arbor 44 through the first and second gearwheels 96, 98. Hereupon, the discharging section 68 is pivotably supported on the joint part 62 and fixedly supported on the spindle head 16 through the stopper 100. Therefore, the discharging section 68 cannot rotate about the Z-axis together with the spindle 28, but pivot about the shaft 66 in one vertical plane while accompanying the rotation of the second gearwheel 98. In this way, the desired angle pivot motion of the discharging section 68 of the laser beam processing arbor 44 can be obtained by rotating the spindle 28 through a predetermined angle.

In the compound machine tool 10 having the above-mentioned construction, when carrying out a machining process, the tool holder 39 holding the cutting tool is mounted on the tool supporting section 40 of the spindle 28 by the tool changer 52, so as to machine the workpiece W. Next, in the condition where the workpiece W is still fixed on the table 22, the tool holder 39 is changed to the laser beam processing arbor 44 by the tool changer 52. Then, the laser beam emitted by activating the generator 46 is directed to the straight through passage 42 of the spindle 28 through the mirror 48 and the duct member 50, and is discharged from the discharging port 74 of the discharging section 68 of the laser beam processing arbor 44 onto the surface of the workpiece W. At this time, the spindle 28 is rotated in the predetermined angle, so as to pivot the discharging section 68 of the laser beam processing arbor 44 in accordance with the inclined angle of the objective surface of the workpiece W, in the manner as mentioned above. As a result, the movable reflecting plate 78 including the reflecting mirror 80 is simultaneously rotated about the shaft 66, thereby deflecting the laser beam in the desired direction.

Figure 5A:
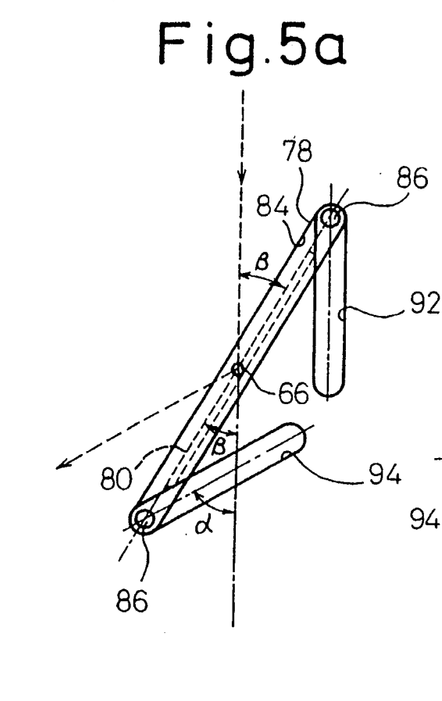
FIG. 5a illustrates the operation of an interlocking construction between a discharging section and a reflecting mirror of the laser beam processing arbor, showing a condition where the inclined angle $\alpha$ of the discharging section is 60°.
Figures 5B, 5C:
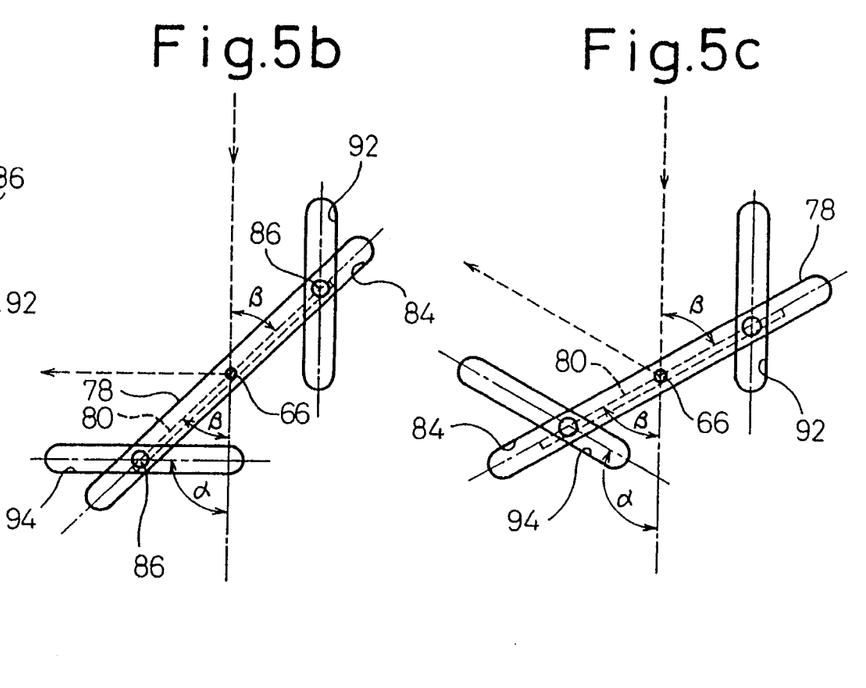
FIG. 5b illustrates the operation of an interlocking construction between a discharging section and a reflecting mirror of the laser beam processing arbor, showing a condition where the inclined angle $\alpha$ of the discharging section is 90°.
FIG. 5c illustrates the operation of an interlocking construction between a discharging section and a reflecting mirror of the laser beam processing arbor, showing a condition where the inclined angle $\alpha$ of the discharging section is 120°.

Such an interlocked motion is accomplished by, as mentioned above, the linking pieces 86 which slide in the guide grooves 92, 94 of the guide plates 88, 90 fixed to the joint part 62 and the discharging section 68, and in the corresponding guide grooves 84 provided on the side portions 82 of the movable reflecting plate 78. In this regard, as shown in FIGS. 5a to 5c, when the relationship between the tilt angle of the discharging section 68 in relation to the joint part 62, i.e., the tilt angle $\alpha$ of the guide grooves 94 of the guide plate 90 of the discharging section 68 in relation to the Z-axis, and the tilt angle $\beta$ of the reflecting surface of the reflecting mirror 80 of the movable reflecting plate 78 in relation to the Z-axis, is always indicated as $\alpha = 2\beta$, the laser beam straightly advancing along the Z-axis in the first passage 64 of the joint part 62 can advance along the center line of the second passage 70 of the discharging section 68 after being deflected by the reflecting mirror 80. As shown in FIGS. 5a to 5c (FIG. 5a shows a state where $\alpha = 60°$, FIG. 5b shows $\alpha = 90°$, and FIG. 5c shows $\alpha = 120°$), this relationship, $\alpha = 2\beta$, is continuously maintained in any pivoted position of the discharging section 68 by the function of the linking pieces 86 which freely slide in the guide grooves 84, 92, 94. This is a particular function resulted from a fact that the crossing points formed by the linking pieces 86 between the guide grooves 84 rotating about the shaft 66 of a fixed fulcrum and the guide grooves 92 continuously fixedly positioned as well as the guide grooves 94 pivoting about the shaft 66 are located at respective positions determined by the tilt angle $\alpha$ of the discharging section 68, and the tilt angle $\beta$ of the reflecting mirror 80 is determined accordingly, and a fact that the laser beam is reflected on the rotating axis of the reflecting mirror 80.

As is understood from FIGS. 5a to 5c, the minimum tilt angle of the discharging section 68 is determined by the respective length of the guide grooves 84, 92, 94. In this construction, the discharging section 68 cannot be arranged at the tilt angle $\alpha = 0$. Therefore, when the surface crossing at right angles to the Z-axis must be processed, it is advantageous that the arbor is changed to the laser beam processing arbor having no angle-adjusting mechanism, of which structure is known (see International Patent Application No. PCT/JP92/00314).

In the present invention, the other various modifications can of course be provided. For example, in the above preferred embodiment, the actuating means for pivoting the discharging section 68 of the laser beam processing arbor 44 relative to the attaching section 54 and the joint part 62 is constructed by the transmitting mechanism which comprises the first gearwheel 96 fixed to the spindle 28 and the second gearwheel 98 supported by the shaft 66 passing through the wall of the laser beam processing arbor 44, but instead the other construction may be adopted wherein a small electric motor is directly installed on the laser beam processing arbor 44 so as to pivot the discharging section 68. In this case, the attaching section 54 and the joint part 62 of the laser beam processing arbor 44 may be integrated. Also, it is necessary to provide a circuit arrangement, for transporting a control signal to the electric motor, the spindle head 16, the spindle 28, the laser beam processing arbor 44, and so on. According to such construction, the discharging section 68 of the laser beam processing arbor 44 can pivot against the attaching section 54 and rotate with the spindle 28, therefore it becomes possible to carry out the laser beam process on the inclined surfaces, facing toward any direction, of the workpiece W.

Industrial Applicability

As is clear from the above description, the present invention has a construction in which a laser beam processing arbor adapted to be mounted on the spindle of the compound machine tool, capable of laser beam processing, comprises an attaching section adapted to be fitted to a tool supporting section and a discharging section pivotably connected to the end of the attaching section and having inside a lens for condensing a laser beam, and in which a laser beam reflecting means, that is rotated by accompanying the pivot motion of the discharging section and directs a laser beam passing through the attaching section to the lens in the discharging section in any pivoted position of the discharging section, is disposed in a bridging manner between the attaching section and the discharging section. As a result, when carrying out a laser beam process on the inclined surfaces of a three-dimensional workpiece W, it is possible to shift the discharging section and the laser beam reflecting means of the laser beam processing arbor into the desired tilt position so as to carry out the laser beam process on the desired inclined surfaces of the workpiece. Therefore, the laser beam process can be successively carried out on the various inclined surfaces of the workpiece having a complex three-dimensional shape, without changing the position of the workpiece. Thus, according to the present invention, the performance of the compound machine tool including a laser beam processing arbor is improved, and thus the automatizing is facilitated.

I claim:

1. A compound machine tool to carry out a machining process and a laser beam process on a workpiece placed on a table, comprising a fixed machine block; a table arranged movably along first and second axes orthogonal to each other on the fixed machine block; a spindle arranged movably along a third axis orthogonal to both of the first and second axes on the fixed machine block, the spindle including a straight through passage with a certain diameter extending along the third axis inside the spindle and a tool supporting section for detachably supporting a tool holder holding a cutting tool at one end of the straight through passage, and the spindle rotating about the third axis while disposing the tool supporting section opposite to the table; a laser beam path means for directing a laser beam along the third axis from a rear end of the spindle into the straight through passage; a laser beam processing arbor detachably mounted on the tool supporting section of the spindle and having inside the arbor a lens for condensing and discharging the laser beam directed by the laser beam path means; and a tool changing means for automatically mounting and removing the tool holder and the laser beam processing arbor to the tool supporting section of the spindle so as to change the holder and the arbor, characterized in that said laser beam processing arbor comprises:

an attaching section detachably fitted to said tool supporting section of said spindle, and having a first passage extending along said third axis inside said attaching section for passing a laser beam directed by said laser beam path means when being fitted;

a discharging section pivotably connected to one end of said attaching section through a shaft element which is disposed perpendicular to a path of the laser beam along said third axis when said attaching section is fitted to said tool supporting section, and having a second passage connected to said first passage inside said discharging section for fixedly supporting said lens in said second passage;

a laser beam reflecting means supported on said shaft element and disposed between said first passage and said second passage, for rotating about said shaft element while accompanying a pivoting motion of said discharging section, and for directing the laser beam passed through said first passage toward said lens in said second passage at any pivoted position of said discharging section; and a linking means for linking said laser beam reflecting means to said attaching section and said discharging section, so as to interlock the pivoting motion of said discharging section relative to said attaching section and a rotating motion of said laser beam reflecting means;

wherein said compound machine tool further comprises an actuating means for causing the pivoting motion of said discharging section of said laser beam processing arbor.

2. A compound machine tool as set forth in claim 1, wherein said laser beam reflecting means comprises a movable reflecting plate supported on said shaft element between said first passage and said second passage of said laser beam processing arbor, a reflecting surface of said movable reflecting plate being disposed in a plane involving a center axis of said shaft element.

3. A compound machine tool as set forth in claim 2, wherein said movable reflecting plate includes a reflecting mirror on one face thereof for deflecting the path of the laser beam, a surface of said reflecting mirror being disposed in the plane involving the center axis of said shaft element.

4. A compound machine tool as set forth in claim 1, wherein said laser beam reflecting means comprises a movable reflecting plate supported on said shaft element between said first passage and said second passage of said laser beam processing arbor, and wherein said linking means comprises first guide grooves arranged on each side portion of said movable reflecting plate and extending symmetrically in relation to said shaft element and parallel to a reflecting surface of said movable reflecting plate, linking pieces disposed slidably in each of said first guide grooves, and second guide grooves arranged on walls of said first passage and said second passage of said laser beam processing arbor and extending in an axial direction of each passage, each of said linking pieces disposed in said first guide grooves being engaged with said second guide grooves.

5. A compound machine tool as set forth in claim 1, wherein said actuating means comprises a drive unit for rotating said spindle, and a transmitting mechanism for transmitting a rotating motion of said spindle to said discharging section of said laser beam processing arbor while transferring the rotating motion to a rotating motion about said shaft element disposed perpendicular to said third axis, so as to pivot said discharging section.

6. A compound machine tool as set forth in claim 5, wherein said transmitting mechanism comprises a first gearwheel fixed coaxially to said spindle, and a second gearwheel supported on said shaft element of said laser beam processing arbor and connected to said discharging section so as to engage with said first gearwheel when said laser beam processing arbor is mounted on said tool supporting section.

* * * * *